United States Patent [19]

Lee

[11] Patent Number: 4,997,908

[45] Date of Patent: Mar. 5, 1991

[54] SOLVENT RESISTANT POLYMIDESILOXANE

[75] Inventor: Chung J. Lee, Amherst, N.Y.

[73] Assignee: Occidental Chemical Corporation, Niagara Falls, N.Y.

[21] Appl. No.: 434,144

[22] Filed: Nov. 13, 1989

[51] Int. Cl.$^5$ .................. C08G 8/02; C08G 69/26; C08G 69/28; C08G 77/04
[52] U.S. Cl. .................................... 528/353; 528/26; 528/125; 528/128; 528/229; 528/351
[58] Field of Search ............... 528/353, 352, 229, 125, 528/128, 26

[56] References Cited

U.S. PATENT DOCUMENTS

| | | | |
|---|---|---|---|
| 3,708,459 | 1/1973 | Lubowitz | 528/229 |
| 4,321,319 | 3/1982 | Shoji et al. | 528/353 |
| 4,395,527 | 7/1983 | Berger | 528/26 |
| 4,829,131 | 5/1989 | Lee | 525/426 |
| 4,853,452 | 8/1989 | Lee | 528/26 |

FOREIGN PATENT DOCUMENTS 2174399 11/1986 United Kingdom .

*Primary Examiner*—John Kight, III
*Assistant Examiner*—P. Hampton-Hightower
*Attorney, Agent, or Firm*—James F. Tao; Richard D. Fuerle

[57] ABSTRACT

Disclosed is a substantially fully imidized diglyme-insoluble, N-methylpyrrolidone-soluble polyimidesiloxane which is the reaction product of a dianhydride, about 1 to about 5% by weight of a mono-anhydride, and a mixture of about 20 to about 50% by weight siloxane diamine and about 50 to about 70% by weight non-siloxane diamine. The non-siloxane diamine is a mixture of about 33 to about 50 mole percent of a first diamine having the general formula

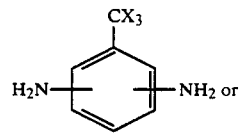

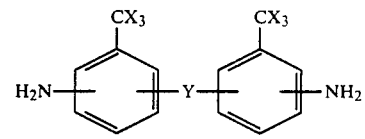

and about 50 to about 67 mole percent of a second diamine having the general formula

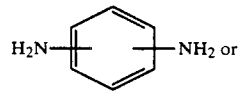

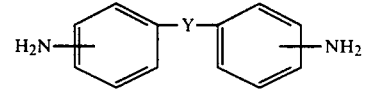

were each "X" is independently selected from hydrogen and halogen and each "Y" is independently selected from —CH$_2$—,

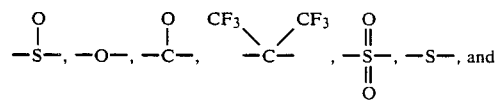

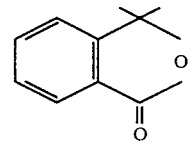

The polyimidesiloxanes are very useful in coating wire, cable, and circuit boards.

26 Claims, No Drawings

SOLVENT RESISTANT POLYMIDESILOXANE

BACKGROUND OF THE INVENTION

This invention relates to solvent resistant polyimidesiloxanes. In particular, it relates to polyimidesiloxanes prepared from a mixture of non-siloxane diamines, which impart solvent resistance without a loss of other desirable properties.

Polymers used in coating wire and cable are required to have a low dielectric constant, high elongation, and resistance to attack by chemicals and solvents. Polymers used in making three dimensional circuit boards (known as 3-D molded wire boards) are required to have similar properties and, in addition, need to be solderable. A polymer is solderable if it will not turn soft and/or decompose at the soldering temperature, which is about 260° C. Polymers used in these applications have included polyvinyl chloride, polyfluorovinylidene, polyethersulfones, polysulfones, and polyetherketones. However, the use of halogenated polymers is being restricted because they emit toxic gases when burned. While the sulfone and ketone polymers have excellent properties, their dielectric constants are in the range of about 3.4 to about 3.6, and, for many applications, a coating having a lower dielectric constant would be desirable.

Because polyimidesiloxanes have many of these desirable properties, including a lower dielectric constant and high temperature stability, they are likely candidates for use in coating wire, cable, and circuit boards. However, it is has been found that conventional polyimidesiloxanes exhibit poor solvent resistance. When conventional polyimidesiloxane coatings are cleaned with solvents such as methylene chloride, trichloroethane, or methyl ethyl ketone, which are used in the wire and cable and circuit board industries, the polyimidesiloxanes will typically lose weight as they dissolve in the solvent, or will gain weight as they absorb the solvent. This lack of solvent stability results in the weakening of the coating and its subsequent cracking and failure. Efforts to make polyimidesiloxanes less subject to solvent attack have, until now, resulted in a deterioration of their other desirable and necessary properties, such as elongation.

SUMMARY OF THE INVENTION

I have discovered that polyimidesiloxanes can be made stable in the presence of cleaning solvents without a loss of other desirable properties such as elongation by making the polymer from a mixture of two different types of diamines in a particular molar ratio. The polyimidesiloxanes of this invention are very useful in coating wire and cable and circuit boards because they have a dielectric constant of about 2.6 to 2.9, which is lower than the dielectric constants of the sulfone and ketone polymers, they retain the high temperature properties of polyimidesiloxanes, they are chemically resistant, they have a $T_g$ over 250° C., and they have an elongation greater than 100, which is needed for these applications.

DESCRIPTION OF THE INVENTION

The polyimidesiloxanes of this invention can be prepared according to the well-known reaction of a dianhydride with a diamine, which first proceeds to an intermediate amic acid stage before reaching the final imide product:

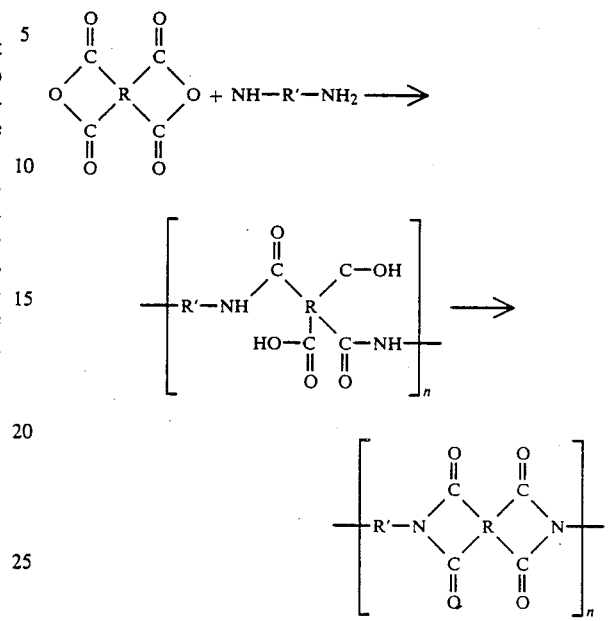

Almost any dianhydride can be used in this reaction. Examples of suitable dianhydrides include pyromellitic dianhydride, biphenyl dianhydride, benzophenone tetracarboxylic dianhydride, oxydiphthalic anhydride, 2,2-bis(3,4-dicarboxyphenyl)propane dianhydride, 3,3',4,4'-biphenyltetracarboxylic acid dianhydride, 2,2',3,3'-biphenyltetracarboxylic acid dianhydride, bis(3,4-dicarboxyphenyl) ether dianhydride, bis(3,4-dicarboxyphenyl) thioether dianhydride, bisphenol A bisether dianhydride, "6-F" dianhydride (5,5'-[(2,2,2-trifluoro-1-(trifluoromethyl) ethylidene]bis-1,3-isobenzofurandione), 2,2-bis(3,4-dicarboxylphenyl) hexafluoropropane dianhydride, 2,3,6,7-naphthalenetetracarboxylic acid dianhydride, bis(3,4-dicarboxyphenyl) sulfone dianhydride, 1,2,5,6-naphthalenetetracarboxylic acid dianhydride, hydroquinone bisether dianhydride, 4,4'-oxydiphthalic anhydride, bis(3,4-dicarboxyphenyl) sulfoxide dianhydride, and 3,4,9,10-perylene tetracarboxylic acid dianhydride. The preferred dianhydrides are 4,4'-oxydiphthalic anhydride, 3,3',4,4'-biphenyl tetracarboxylic acid dianhydride, 3,3,,4,4'-benzophenone tetracarboxylic dianhydride, and pyromellitic dianhydride.

In addition to the dianhydride, up to about 5 mole percent (based on total moles of anhydride) of a mono-anhydride is used to end cap the polymer chain to prevent further polymerization and a viscosity increase during melting. Preferably, the amount of mono-anhydride is 1 to about 5 mole percent of the anhydride present. If more than about 5 mole percent of the mono-anhydride is present, the polymer may be too brittle, and if less than about 1 mole percent of the mono-anhydride is present, the resulting polymer may have too high a molecular weight. Examples of suitable mono-anhydrides include tetrahydrophthalic anhydride, 1-methyl tetrahydrophthalic anhydride, hexahydrophthalic anhydride, 1-methyl hexahydrophthalic anhydride, maleic anhydride, nadic methyl anhydride, and phthalic anhydride. The preferred mono-anhydride is phthalic anhydride because it is inexpensive and easily obtainable.

The diamine monomer consists of a mixture of about 20 to about 50% by weight (based on total diamine weight) siloxane diamine monomer and about 50 to about 70% by weight non-siloxane diamine monomer. If the siloxane diamine is less than 20% of the total diamine monomer, the polymer is too rigid and its melting point is too high, and if the siloxane diamine is over 50% of the diamine monomer, the polymer may have poor mechanical strength.

A siloxane diamine is a diamine that contains at least one

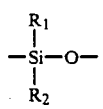

group, wherein $R_1$ and $R_2$ are organic. Examples of suitable siloxane diamines include compounds having the general formula:

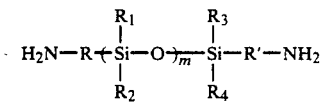

where $R_1$, $R_2$, $R_3$, and $R_4$ are each independently selected from a substituted or unsubstituted aliphatic mono-radical of 1 to 12 carbon atoms or substituted or unsubstituted aromatic mono-radical of 6 to 10 carbon atoms, R' is similar, but is a di-radical, and "m" is 1 to 200. Examples of suitable mono-radicals include $-CH_3$, $-CF_3$, $-(CH_2)_nCF_3$, $-C_6H_5$, $-CF_2-CHF-CF_3$ and

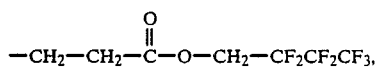

and examples of suitable di-radicals include $CH_{2n}$, $CF_{2n}$, $-(CH_2)_nCF_2-$, $-C_6H_4-$, and X-A-Y, where X and Y are independently selected from O, S. and

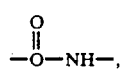

"A" is an aryl di-radical, and "n" is 1 to 10. Because of its availability and low cost, the preferred siloxane diamine is

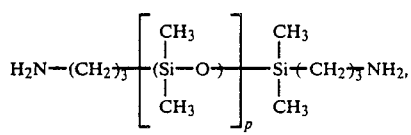

wherein "p" is 1 to 200, and is preferably greater than 9.

A non-siloxane diamine is a diamine that contains no

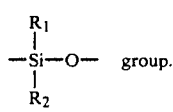

group.

The non-siloxane diamine used in this invention is a mixture of about 33 to about 50 mole percent of a first diamine and about 50 to about 67 mole percent of a second diamine. The first diamine has the general formula

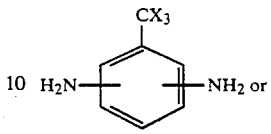

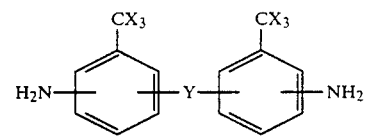

and the second diamine has the general formula

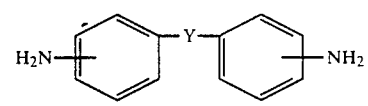

In the above general formulae each "X" is independently selected from hydrogen and halogen, and each "Y" is independently selected from

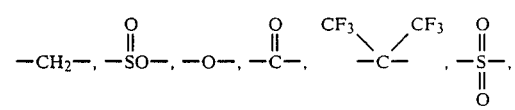

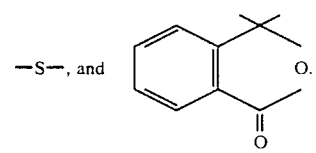

In the formula the first diamine is preferably

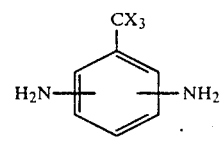

because it provides a high $T_g$ and the second diamine is preferably

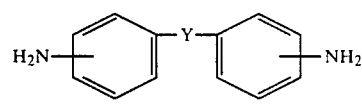

because it provides a high elongation; X is preferably fluorine or hydrogen and Y is preferably oxygen or sulfur because they provide high solvent resistance and elongation. Examples of suitable non-siloxane first diamines include 2,4- and 2,6-diaminotoluene, trifluoromethyl 2,4- and 2,6-diaminobenzene, trifluoromethyl diaminopyridine, and mixtures thereof. The preferred non-siloxane first diamine is diaminotoluene, trifluoromethyl diaminobenzene, trifluoromethyl diaminopyridine, or a mixture thereof because they provide solubility during preparation. Examples of suitable non-siloxane second diamines include m- and p-phenylenediamine oxydianiline, sulfur dianiline, diaminobiphenyl, oxydianiline diaminodiphenyl ether, diaminobenzophenone, diaminodiphenyl sulfone, diaminodiphenyl sulfide, diaminodiphenyl methane, and mixtures thereof. The preferred non-siloxane second diamine is diaminodiphenyl ether, diaminodiphenyl sulfone, or a mixture thereof, because those diamines produce polymers having the highest elongation in conjunction with good solvent resistance.

The polyimidesiloxane is prepared in solution. The solvent used must dissolve not only the starting materials and the intermediate amic acid and polyamic acid, but must also dissolve the polyimidesiloxane product. Suitable solvents include phenol-type solvents such as phenol and cresol, as well as N-methylpyrrolidone (NMP). The preferred solvent is NMP because it is the easiest to handle and polyimides have a high solubility in it. The solids content of the solution can vary from about 5% by weight solids or less, up to the solubility limit, but the solids content is preferably about 10 to about 25% by weight because at greater solids content the viscosity is too high to mix easily, and lower solids contents are uneconomical.

In a commercial or large-scale production, the polyimidesiloxane can be prepared as follows in two stages. The first stage is an exothermic reaction which results in the production of the polyamic acid siloxane. The first stage reaction occurs spontaneously and its completion is noted by the cessation of the exotherm. In the second stage, water is condensed out to form the imide ring. In the second stage reaction, it is advantageous to add a solvent that forms an azeotrope with water. The reaction mixture can then be heated above the azeotropic boiling point until no more water is emitted. The polyimidesiloxane then can be precipitated by the addition of a non-solvent such as water. It can then be dried and melted for application to wires, cables, or circuit boards. Such applications can be made by extrusion or by various other coating processes. The polyimidesiloxanes of this invention are substantially fully imidized and, while they are soluble in NMP, they are insoluble in other common solvents such as diglyme.

The following examples further illustrate this invention:

EXAMPLE 1

A 20% solution of benzophenone tetracarboxylic dianhydride, a siloxane diamine having the general formula

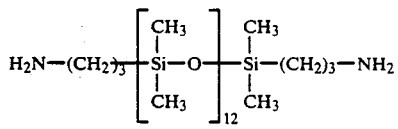

and one or more non-siloxane diamines in NMP was reacted at room temperature for about 4 to 16 hours to prepare a polyamic acid siloxane. The polyamic acid siloxane was poured into a polytetrafluoroethylene-coated dish and was reacted at about 140° C. for about 4 hours, then at about 250° C. for about 15 to 30 minutes to prepare the polyimidesiloxane. The polimidesiloxane was re-cast to glass and was heated at 210° C. to evaporate the NMP. Samples of the polyimidesiloxane were tested for solubility in methylene chloride by immersion at temperature for 24 hours and the change in weight was noted. The following table gives the results.

| Mole Percent of Non-Siloxane Diamine | | % Siloxane Diamine* | % weight Change in Methylene Chloride |
|---|---|---|---|
| 2,4-Diaminotoluene | 4,4-diaminodiphenylether | | |
| 100 | 0 | 29 | +68 |
| 75 | 25 | 28.5 | +12.8 |
| 66⅔ | 33⅓ | 28.2 | +6.49 |
| 50 | 50 | 27.9 | +5.90 |

*Based on total weight of diamine.

The above table shows that when the non-siloxane diamine is 100% diaminotoluene or the amount of diaminodiphenylether present in the non-siloxane diamine is only 25% the solvent resistance to methylene chloride is unacceptably poor, but when the amount of diaminodiphenyl ether in the non-siloxane diamine is 33⅓% or 50% the solvent resistance is acceptable. The $T_g$ of the sample containing one-half diaminodiphenylether was 250° C., which is adequate for soldering.

EXAMPLE 2

Example 1 was repeated using oxydiphthalic anhydride instead of benzophenone tetracarboxylic anhydride. The samples produced were tested for resistance to 1,1,1-trichloroethane and their tensile strength and elongation were measured. The following table gives the results:

| Mole Percent of Non-Siloxane Diamine | | % Siloxane Diamine* | Tensile Strength (psi) | Elongation (%) | Change in weight in Trichloroethane |
|---|---|---|---|---|---|
| Diaminotoluene | Diaminodiphenyl ether | | | | |
| 100 | 0 | 56 | 3030 ± 140 | 200 ± 20 | — |
| 66⅔ | 33⅓ | 55 | 1880 ± 188 | 70.5 ± 2 | −100% |
| 50 | 50 | 55 | 1067 ± 50 | 24.1 ± 4.2 | −100% |
| 33⅓ | 66⅔ | 55 | 2146 ± 208 | 101.9 ± 14.1 | −63% |
| 0 | 100 | 55 | 2364 ± 315 | 104.7 ± 17.6 | −12.4% |

*Based on total weight of diamine.

The above table shows that as the amount of diaminodiphenylether in the polymer was increased to one-half of the total non-siloxane diamine, the elongation fell to an unacceptably low 24.1%, but as the amount of diaminodiphenylether increased from one-half to 100% of the non-siloxane diamine, the elongation increased to acceptable levels greater than 100%. However, when the amount of diaminodiphenyl ether was 100% of the non-siloxane diamine, the polymer was insoluble in NMP and was therefore unacceptable, because it cannot be imidized in reactors.

EXAMPLE 3

Example 1 was repeated and the polyimidesiloxanes were tested for solubility in methylene chloride and methyl ethyl ketone. The following table gives the results:

| Mole Percent of Non-Siloxane Diamine | | % Siloxane Diamine* | % weight change in | |
|---|---|---|---|---|
| 2,4-Diamino-toluene | 4,4-diaminodi-phenylether | | Methylene Chloride | Methyl ethyl ketone |
| 100 | 0 | 54.1 | −100 | −100 |
| 66⅔ | 33⅓ | 53.4 | — | — |
| 50 | 50 | 52 | — | — |
| 33⅓ | 66⅔ | 51.8 | −42 | −6.7 |

*Based on total weight of diamine.

The above table shows that when the siloxane content is over 50%, a larger amount of 4,4'-diaminodiphenyl ether is required to impart the necessary solvent resistance.

I claim:

1. A substantially fully imidized diglyme-insoluble, N-methyl pyrrolidone-soluble polyimidesiloxane comprising the reaction product of a dianhydride, up to about 5 mole percent, based on total moles of anhydride, of a monoanhydride, and a mixture of about 20 to about 50% by weight siloxane diamine and about 50 to about 70% by weight non-siloxane diamine, where said non-siloxane diamine comprises a mixture of about 33 to about 50 mole percent of a first diamine having the general formula

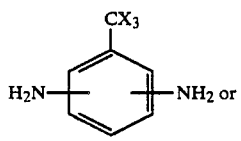

or

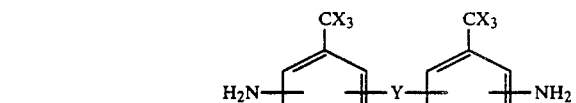

and about 50 to about 67 mole percent of a second diamine having the general formula

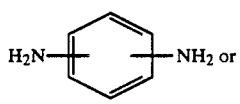

or

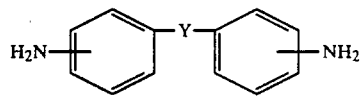

where each "X" is independently selected from hydrogen and halogen and each "Y" is independently selected from —CH₂—,

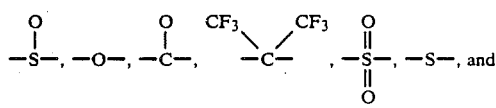

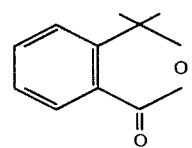

2. A polyimidesiloxane according to claim 1 wherein said first diamine is selected from the group consisting of diaminotoluene, trifluoromethyl diaminobenzene, trifluoromethyl diaminopyridine, and mixtures thereof.

3. A polyimidesiloxane according to claim 1 wherein said second diamine is selected from the group consisting of diaminodiphenyl ether, diaminodiphenyl sulfide, and mixtures thereof.

4. A polyimidesiloxane according to claim 1 wherein said dianhydride is selected from the group consisting of 4,4'-oxydiphthalic anhydride, 3,3',4,4'-biphenyl tetracarboxylic acid dianhydride, 3,3',4,4'-benzophenone tetracarboxylic dianhydride, and pyromellitic dianhydride.

5. A polyimidesiloxane according to claim 1 wherein said siloxane diamine has the formula

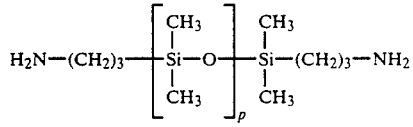

where "p" is 1 to 200.

6. A polyimidesiloxane according to claim 5 wherein "p" is greater than 9.

7. A polyimidesiloxane according to claim 1 wherein the amount of said monoanhydride is about 1 to about 5 mole percent.

8. A shaped polyimidesiloxane product according to claim 1.

9. A wire or cable coated with a polyimidesiloxane according to claim 1.

10. A three dimensional circuit board molded from a polyimidesiloxane according to claim 1.

11. A solution in a solvent of a polyimidesiloxane according to claim 1.

12. A solution according to claim 11 wherein said solvent is N-methyl pyrrolidone.

13. A substantially fully imidized diglyme-insoluble, N-methyl pyrrolidone-soluble polyimidesiloxane consisting essentially of the reaction product of a dianhydride, up to about 5 mole percent, based on total moles of anhydride, of a monoanhydride, and a mixture of about 20 to about 50% by weight siloxane diamine and about 50 to about 70% by weight non-siloxane diamine, where said non-siloxane diamine comprises a mixture of about 33 to about 50 mole percent of a first diamine having the general formula

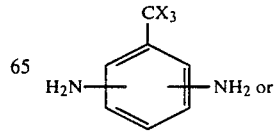

or

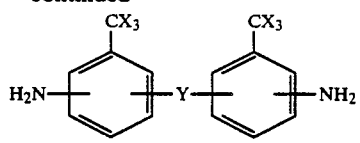

and about 50 to about 67 mole percent of a second diamine having the general formula

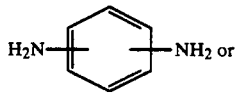

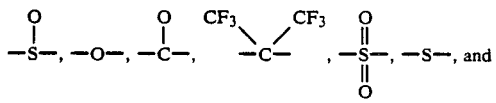

where each "X" is independently selected from hydrogen and halogen and each "Y" is independently selected from —CH$_2$—,

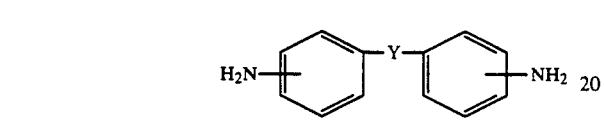

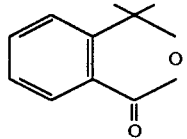

14. A polyimidesiloxane according to claim 13 wherein said first diamine is selected from the group consisting of diaminotoluene, trifluoromethyl diaminobenzene, trifluoromethyl diaminipyridine, and mixtures thereof.

15. A polyimidesiloxane according to claim 13 wherein said second diamine is selected from the group consisting of diaminodiphenyl ethere, diaminodiphenyl sulfide, and mixtures thereof.

16. A polyimidesiloxane according to claim 13 wherein said dianydride is selected from the group consisting of 4,4'-oxydiphthalic anhydride, 3,3',4,4'-biphenyl tetracarboxylic acid dianhydride, 3,3',4,4'-benzophenone tetracarboxylic dianhydride, and pyromellitic dianhydride.

17. A poyimidesiloxane according to claim 13 wherein said siloxane diamine has the formula

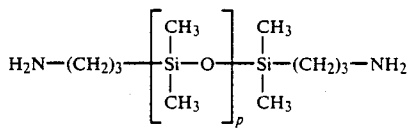

where "p" is 1 to 200.

18. A polyimidesiloxane according to claim 13 wherein "p" is greater than 9.

19. A polyimidesiloxane according to claim 13 wherein the amount of said monoanhydride is about 1 to about 5 mole percent.

20. A shaped poyimidesiloxane product according to claim 13.

21. A wire or cable coated with a polyimidesiloxane according to claim 13.

22. A three dimensional circuit board molded from a polyimidesiloxane according to claim 13.

23. A solution in a solvent of a polyimidesiloxane according to claim 13.

24. A solution according to claim 23 wherein said solvent is N-methyl pyrrolidone.

25. A polyimidesiloxane according to claim 1 wherein X is halogen.

26. A polyimidesiloxane according to claim 25 wherein X is fluorine.

* * * * *